United States Patent
Starodoumov et al.

(10) Patent No.: US 10,535,975 B2
(45) Date of Patent: Jan. 14, 2020

(54) HIGH POWER SUB-400 FEMTOSECOND MOPA WITH SOLID-STATE POWER AMPLIFIER

(71) Applicant: Coherent, Inc., Santa Clara, CA (US)

(72) Inventors: Andrei Starodoumov, Campbell, CA (US); Norman Hodgson, Belmont, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 15/692,653

(22) Filed: Aug. 31, 2017

(65) Prior Publication Data

US 2019/0067897 A1 Feb. 28, 2019

(51) Int. Cl.
| | |
|---|---|
| H01S 3/23 | (2006.01) |
| H01S 3/06 | (2006.01) |
| H01S 3/067 | (2006.01) |
| H01S 3/16 | (2006.01) |

(52) U.S. Cl.
CPC .......... *H01S 3/2325* (2013.01); *H01S 3/0606* (2013.01); *H01S 3/06754* (2013.01); *H01S 3/1618* (2013.01); *H01S 3/1643* (2013.01); *H01S 3/235* (2013.01); *H01S 3/2333* (2013.01); *H01S 3/2341* (2013.01)

(58) Field of Classification Search
CPC .. H01S 3/10023; H01S 3/2325; H01S 3/1618; H01S 3/1643; H01S 3/0606; H01S 3/06754; H01S 3/2308; H01S 3/235; H01S 5/1212
See application file for complete search history.

(56) References Cited

U.S. PATENT DOCUMENTS

| | | |
|---|---|---|
| 5,572,358 A | 11/1996 | Gabl et al. |
| 2006/0120418 A1* | 6/2006 | Harter .................. H01S 3/1643 372/30 |
| 2006/0159137 A1* | 7/2006 | Shah ....................... G02B 6/13 372/25 |
| 2011/0200061 A1 | 8/2011 | Harter et al. |
| 2012/0105945 A1* | 5/2012 | Erlandson .......... G02B 27/0966 359/337.2 |
| 2014/0211301 A1* | 7/2014 | Starodoumov ....... H01S 3/0941 359/341.5 |

OTHER PUBLICATIONS

Fiber-Optics.info "Center wavelength" Nov. 8, 2018 pp. 1-2. (Year: 2018).*
Laser components "Yb:YAG" pp. 1-2 (Year: 2018).*
Matsubara et al. "A picosecond thin-rod Yb:YAG regenerative laser amplifier with the high average power of 20W" Laser Phys. Lett. 10 (2013), pp. 1-4. (Year: 2013).*
F. Druon et al. "New Yb-doped crystals for high-power and ultra-short laser" Proc. Of SPIE vol. 6400, pp. 64000D1-64000D-14 May 31, 2019 (Year: 2019).*

(Continued)

*Primary Examiner* — Tod T Van Roy
*Assistant Examiner* — Delma R. Fordé
(74) *Attorney, Agent, or Firm* — Morrison & Foerster LLP

(57) ABSTRACT

Laser-apparatus includes a fiber-MOPA arranged to deliver amplified seed optical pulses having a wavelength of about 1043 nanometers to a multi-pass ytterbium-doped yttrium aluminum garnet solid-state optical amplifier for further amplification.

11 Claims, 5 Drawing Sheets

(56) References Cited

OTHER PUBLICATIONS

I. J. Graumann et al. "Peak-power scaling of femtosecond Yb:Lu2O3 thin-disk lasers" Optical Society of America, vol. 25, No. 19, Optics Express pp. 22519-22536, Sep. 18, 2017 (Year: 2017).*

Clara J. Saraceno et al. "SESAMs for high-power femtosecond modelocking: power scaling of a Yb:Lu2O3 thin disk laser to 23W and 235 fs" vol. 19, No. 21 Optics Express, pp. 20288-20300, (Year: 2011).*

Laser Components "Yb:YAG" pp. 1-2. (Year: 2019).*

Baum et al., "Axial Mode Tuning of a Single Frequency Yb:YAG Thin Disk Laser", Appl. Phys. B, vol. 81, 2005, pp. 1091-1096.

Brauch et al., "Multiwatt Diode-Pumped Yb;YAG Thin Disk Laser Continuously Tunable Between 1018 and 1053 nm", Optics Letters, vol. 20, No. 7, Apr. 1, 1995, pp. 713-715.

João et al., "Numerical Simulation of High-Energy, Ytterbium-Doped Amplifier Tunability", Applied Sciences, vol. 3, 2013, pp. 288-298.

Nakamura, Shinki, "High-Power and High Efficiency Yb:YAG Ceramic Laser at Room Temperature", Frontiers in Guided Wave Optics and Optoelectronics, 2010, 17 pages.

Uemura et al., "Dispersion Compensation of Passively Mode-Locked Diode-Pumped Yb:YAG Laser", Pacific Rim Conference on Lasers & Electro-Optics, 2005, pp. 48-49.

Uemura et al., "Kerr-Lens Mode-Locked Diode-Pumped Yb:YAG Laser with the Transverse Mode Passively Stabilized", Applied Physics Express, vol. 1, 2008, pp. 012007-1-012007-3.

Zhou et al., "High-Efficiency Diode-Pumped Femtosecond Yb:YAG Ceramic Laser", Optics Letters, vol. 35, No. 3, Feb. 1, 2010, pp. 288-290.

Andriukaitis et al., "220-fs 110-mJ Yb:CaF$_2$ Cryogenic Multipass Amplifier", Conference on Lasers and Electro-Optics (CLEO), 2015, 2 pages.

Druon et al., "New Yb-Doped Crystals for High-Power and Ultra-short Lasers", Proc. of SPIE, vol. 6400, 2006, pp. 64000D-1-64000D-16.

International Search Report and Written Opinion received for PCT Patent Application No. PCT/US2018/047357, dated Dec. 10, 2018, 16 pages.

Pugžlys et al., "Multi-mJ, 200-fs, cw-Pumped, Cryogenically Cooled, Yb,Na:CaF$_2$ Amplifier", Optics Letters, vol. 34, No. 13, Jul. 1, 2009, pp. 2075-2077.

Russbueldt et al., "1100 W Yb:YAG Femtosecond Innoslab Amplifier", Proc. of SPIE, vol. 7912, 2011, pp. 79120R-1-79120R-9.

* cited by examiner

HIGH POWER SUB-400 FEMTOSECOND MOPA WITH SOLID-STATE POWER AMPLIFIER

TECHNICAL FIELD OF THE INVENTION

The present invention relates in general to master-oscillator power-amplifier (MOPA) laser-systems. The invention relates in particular to pulsed MOPAs wherein the master oscillator includes a fiber-laser and the power amplifier includes a solid-state amplifier.

DISCUSSION OF BACKGROUND ART

Beams of ultrashort laser pulses are increasingly used for cutting and drilling a wide range of materials. Traditional mechanical processing produces rough surfaces and unwanted defects, such as micro cracks, which degrade and weaken the processed material. Laser material processing using a focused beam of ultrashort laser pulses produces more precise cuts and holes, having higher-quality edges and walls, while minimizing the formation of unwanted defects. High-energy pulses enable parallel processing, whereby a beam of ultrashort pulses is split into a plurality of beams that are directed to different work stations. High-energy ultrashort laser pulses are also used for high harmonic generation, creating laser pulses having attosecond durations and soft x-ray wavelengths to probe dynamic processes of molecules.

Pulsed MOPA systems are arranged to generate output pulses having a greater pulse energy than is possible with any present form of laser-oscillator. A MOPA typically includes a master oscillator arranged to deliver seed pulses. Seed pulses from the master oscillator are delivered to a power amplifier, which increases the energy thereof to a desired energy, with a higher average power.

A mode-locked master-oscillator typically generates seed-pulses at a pulse-repetition frequency (PRF) that is too high and a pulse-duration that is too short for subsequent amplification. Accordingly, the pulses to be amplified are selected from the pulses generated by the master oscillator by a device commonly referred to by practitioners of the art as a pulse-picker, which typically includes an acousto-optic modulator (AOM). The duration of pulses to be amplified is temporally extended by some wavelength-dispersive device, typically referred to as a pulse-stretcher.

The amplified pulses may be temporally shortened to a desired duration by a wavelength-dispersive device commonly referred to by practitioners of the art as a pulse-compressor. This requires that whatever gain-medium is used in the power amplifier has a gain-bandwidth sufficient to allow effective pulse-compression. Because of high average power of the amplified pulses and a correspondingly high pump-power for the power amplifier, it is also required to provide some form of cooling for the amplifier gain-media.

In power amplifiers having a gain-element made of a solid-state gain-medium, the above discussed requirements create a potential conflict, inasmuch as solid-state gain-media having a relatively high thermal-conductivity, for example greater than about 6 Watts per meter Kelvin (W/(m K)), also have a relatively narrow gain-bandwidth at a peak-gain (peak emission) wavelength, for example less than about 10 nanometers (nm). Examples of such gain-media include yttrium aluminum garnet (YAG), lutetium aluminum garnet (LuAG), and gadolinium gallium garnet (GGG).

Existing MOPAs having an ytterbium-doped YAG (Yb:YAG) gain-medium, operate at the peak-gain wavelength of 1030 nm and provide pulse durations between 500 femtoseconds (fs) and 1 picosecond (ps), at an average power of up to about 100 Watts (W). A regenerative amplifier configuration having an optical switch captures a pulse in an optical resonator, the pulse making a plurality of round trips in the resonator to achieve sufficient amplification, before being released by the same or another optical switch. Regenerative amplifiers are complex to control and are relatively expensive. Each optical switch usually has an electro-optic modulator and at least one polarizer. Pulses having a duration of about 300 fs have been reported, but spectral shaping of pulses is required during each of the round trips through the regenerative amplifier. Typically, more than fifty and sometimes many hundreds of round trips are required to extract the available gain and thereby achieve sufficient amplification. Such spectral shaping creates a loss in the regenerative amplifier that effectively limits the maximum accessible output pulse energy and average power.

Current MOPA architectures based on bulk ytterbium-doped regenerative amplifiers, ytterbium-doped photonic crystal amplifier fibers, or ytterbium-doped rod amplifier fibers do not allow economic scaling of output average power to greater than 100 W for compressed pulse durations below 400 fs. This limits industrial applications for MOPA laser-systems. Accordingly, it would be advantageous to have a MOPA system capable of delivering pulses at an average power greater than 100 W with pulse-durations of less than 400 fs, preferably without using a regenerative amplifier as the power amplifier.

SUMMARY OF THE INVENTION

In one aspect of the present invention, laser-apparatus, comprises a source of optical pulses having a first pulse-duration. The optical pulses have a center-wavelength in a predetermined wavelength-range between first and second wavelengths. A pulse-stretcher is arranged to stretch the duration of the optical pulses to a second pulse-duration longer than the first pulse-duration. A solid-state multi-pass amplifier including a crystalline ytterbium-doped gain-element is arranged to amplify the stretched optical pulses. The crystalline ytterbium-doped gain-element has a maximum emission cross-section at a wavelength outside of the predetermined wavelength-range of the optical pulses. A pulse-compressor is arranged to reduce the duration of the amplified optical pulses from the solid-state multi-pass amplifier to a duration of less than about 400 femtoseconds.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
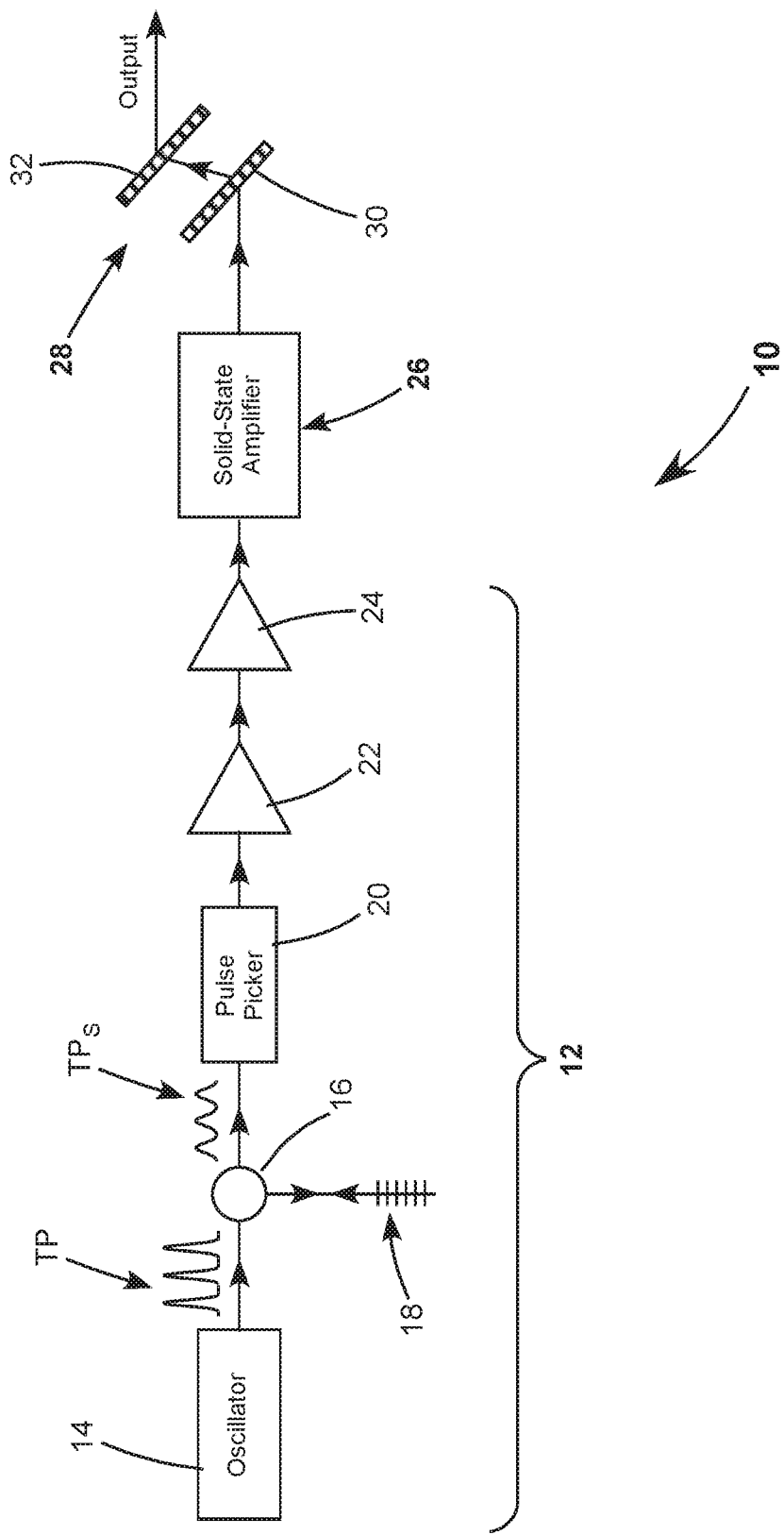
FIG. 1 schematically illustrates one preferred embodiment of a high-power pulsed sub-400 fs MOPA in accordance with the present invention including a fiber-MOPA providing preliminarily-amplified stretched pulses to a solid-state amplifier for further amplification.

Turning now to the drawings, wherein like features are designated by like reference numerals, FIG. 1 schematically illustrates one preferred embodiment 10 of high-power pulsed sub-400 fs MOPA laser-apparatus in accordance with the present invention. Laser-apparatus 10 includes a source of optical pulses 12, here in the form of a fiber-MOPA. Fiber-MOPA 12 includes a fiber-laser oscillator 14, a circulator 16, a chirped fiber Bragg grating (CFBG) reflector 18, a pulse-picker 20, a first fiber-amplifier 22, and a second fiber-amplifier 24.

Fiber-laser oscillator 14 is arranged to deliver a train of laser-radiation pulses TP from which pulses will be selected for further amplification. In one preferred example, fiber-laser oscillator 14 includes an energized ytterbium-doped gain-fiber delivering laser-radiation pulses at a pulse-repetition frequency (PRF). The exemplary laser-radiation pulses have a pulse-duration of about 150 fs and a center-wavelength between about 1038 nm and about 1052 nm. The PRF is about 50 Megahertz (MHz).

Train of laser-radiation pulses TP is delivered to circulator 16 which directs the pulses to CFBG reflector 18. CFBG reflector 18 functions as a pulse-stretcher and temporally extends (stretches) the duration of the laser-radiation pulses to provide a train of stretched pulses $TP_S$, for example, pulses having a duration greater than about 600 ps. The train of stretched pulses returns to circulator 16 and is directed by the circulator to pulse-picker 20, which selects stretched pulses from train $TP_S$ for preliminary amplification by fiber-amplifiers 22 and 24. Pulse-picker 20 may be operated to provide a continuous train of individual stretched pulses at a reduced PRF or may be operated to provide bursts of stretched pulses at the reduced PRF. An exemplary reduced PRF is about 1 MHz. Bursts may have the same or different durations. Fiber-amplifiers 22 and 24 together amplify the stretched pulses to an average power greater than about 10 W and preferably greater than about 20 W.

Preliminarily-amplified stretched pulses from fiber-MOPA 12 are directed to a solid-state amplifier 26, which is arranged to amplify these seed optical pulses to a desired average power. The desired average power is preferably greater than about 50 W and most-preferably greater than about 100 W. The amplified pulses preferably have a pulse energy greater than about 40 micro-Joules (p) and most preferably greater than about 100 µJ. The amplified pulses are delivered by solid-state amplifier 26 to a pulse-compressor 28, here a grating pulse-compressor, including transmission gratings 30 and 32. The pulse-compressor preferably compresses the pulses to a duration of less than about 400 fs and most-preferably less than about 200 fs.

These preferred pulse-parameters require that solid-state amplifier 26 includes a solid-state gain-element made of a gain-medium providing usable optical gain over a full-width half-maximum bandwidth greater than about 10 nm. The relatively broad gain-bandwidth is required to provide amplified pulses having a bandwidth suitable for compression in pulse-compressor 28. A preferred such gain-medium is ytterbium-doped yttrium aluminum garnet (Yb:YAG), which has usable gain in a range of wavelengths from about 1035 nm to about 1052 nm. The term "usable gain", here, means that the gain may be less than the gain at other wavelengths, but nevertheless adequate for the optical amplification process.

Figure 2:
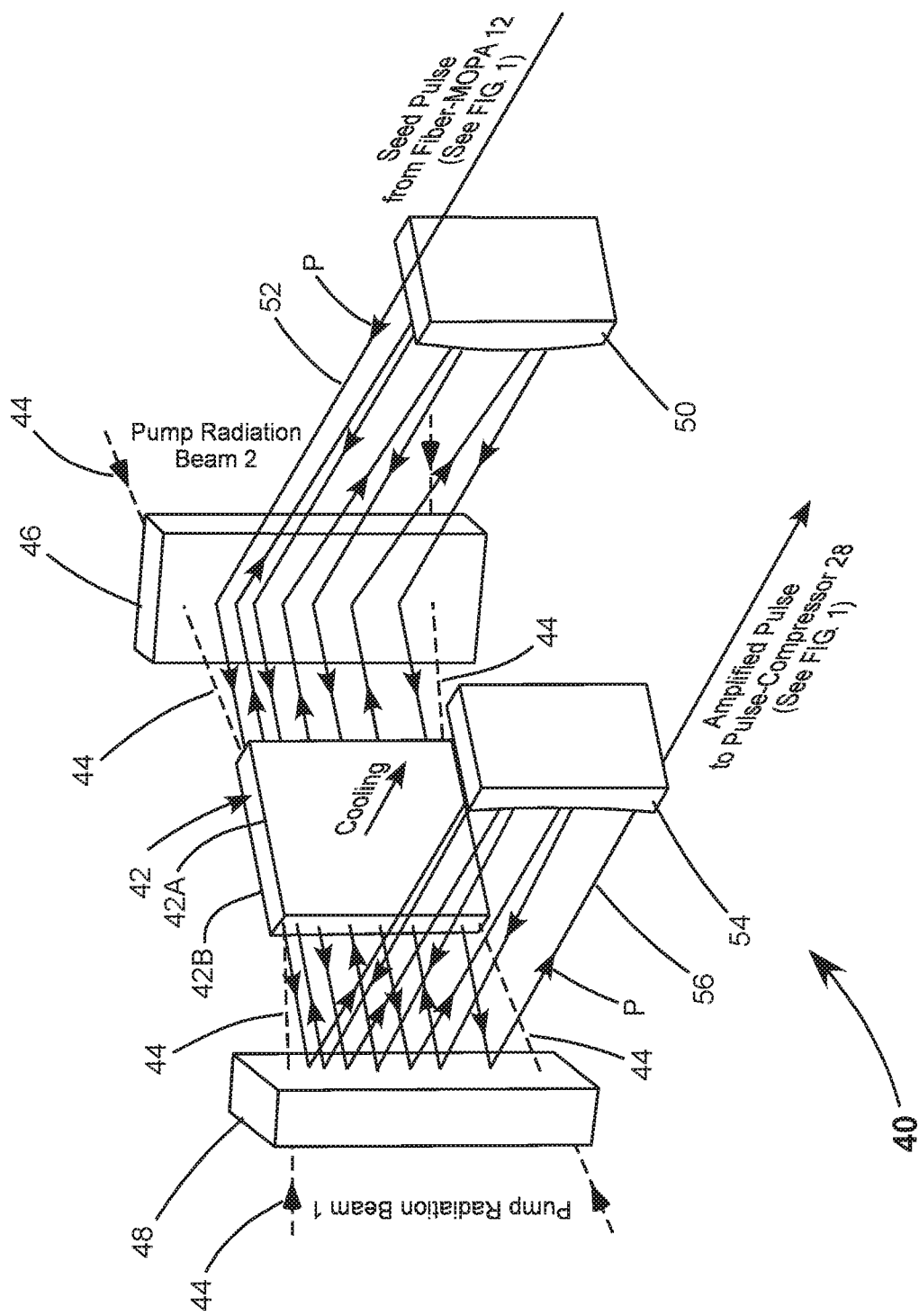
FIG. 2 is a three-dimensional view schematically illustrating one preferred multi-pass configuration of the solid-state amplifier of FIG. 1, wherein the stretched pulses make a plurality of passes through a gain-element in the form of a slab.

FIG. 2 is a three-dimensional view schematically illustrating one preferred multi-pass configuration 40 of solid-state amplifier 26 of FIG. 1. The multi-pass configuration depicted has a gain-element in the form of a slab is referred to as an "InnoSlab" amplifier by practitioners of the art. The InnoSlab amplifier was developed by the Fraunhofer-Institute für Lasertechnik in Aachen, Germany. A gain-slab 42 is energized by optical pumping and provides gain across a range of wavelengths. For a Yb:YAG gain-medium, preferred pump-radiation wavelengths are 940 nm and 969 nm.

Pump-radiation is preferably provided by diode-laser bars (not shown). Pump-radiation 44, depicted bounded by dashed lines, is directed through dichroic mirrors 46 and 48 into both sides of gain-slab 42. Dichroic mirrors 46 and 48 are here arranged at an angle of about 45 degrees to the plane of the gain-slab. Optical pumping of gain-slab 42 creates a thermal lens, which causes the gain-slab to act as a positive cylindrical lens in the horizontal plane of the drawing.

A preliminarily-amplified stretched pulse to be amplified is directed over a convex cylindrical mirror 50 along a beam path 52. The seed optical pulse is reflected from dichroic mirror 46, through gain-slab 42 to dichroic mirror 48. The now partially-amplified optical pulse is reflected from dichroic mirror 48 to a concave cylindrical mirror 54. Cylindrical mirror 54 returns the partially-amplified pulse to dichroic mirror 48 at a point thereon lower than the original point of incidence. Dichroic mirror 48 returns the partially amplified pulse through gain-slab 42 to dichroic mirror 46, which directs the partially amplified pulse to cylindrical mirror 50. From cylindrical mirror 50, the partially amplified pulse makes a sequence of forward and reverse passes through the gain-slab as indicated in the drawing by arrowheads P, being further amplifier during each pass. The amplified pulse leaves solid-state amplifier 40 along a beam path 56 below cylindrical mirror 54 after a predetermined number of passes, here seven, has been completed. The beam size of the partially-amplified pulse increases in a vertical direction with each pass through the amplifier. Cylindrical mirrors 50 and 54 have optical power in the vertical direction.

The slab form of the gain-element is particularly useful in the present invention. The slab form allows laser-radiation being amplified to traverse the length direction of the slab, i.e., allows the length direction of the slab to be the gain direction. Cooling can be applied with high efficiency to one or both of opposite faces 42A and 42B of the slab, in the thickness direction of the slab. This can be summarized as having the gain direction of the slab perpendicular to the cooling direction.

Figure 3:
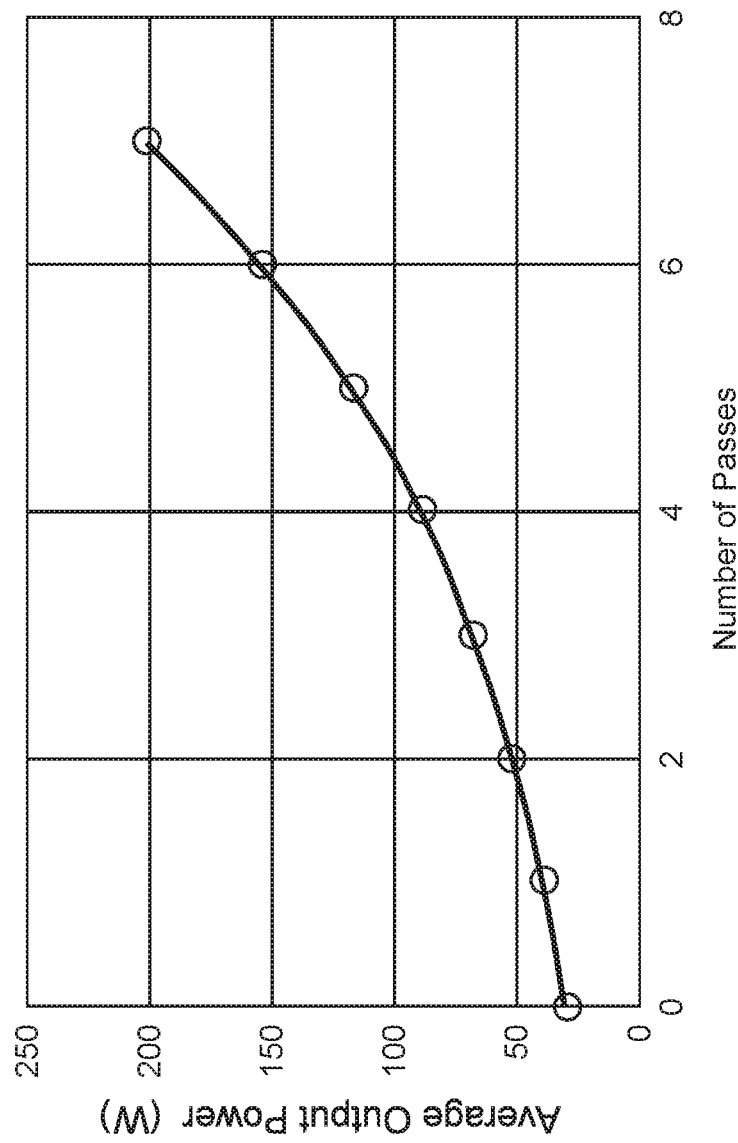
FIG. 3 is a graph schematically illustrating computed average output-power as a function of the number of passes through the solid-state multi-pass amplifier configuration of FIG. 2.

FIG. 3 is a graph schematically illustrating computed average output-power as a function of the number of passes in one example of the solid-state multi-pass amplifier configuration of FIG. 2. Optical elements of the amplifier are arranged and configured in cooperation with thermal lensing in gain-slab 42 such that the beam size of the laser-radiation increases in the vertical direction of the drawing by 30% with each pass. It is assumed that the input seed beam has dimensions 250 µm×250 µm and an average power of 30 W. Gain-slab 42 is assumed to have dimensions 10 mm×10 mm×1 mm. Pump power into the gain-slab is assumed to be 600 W total. After seven passes, the output amplified beam has dimensions 250 µm×1200 µm and an average power of 200 W.

Typically, pulses being amplified make less than twelve passes through the solid-state multi-pass amplifier. This is because the gain-slab width is limited by a distance over which pump-radiation is substantially absorbed, while the gain-slab height will typically be filled by amplified beam in less than twelve passes.

Figure 4:
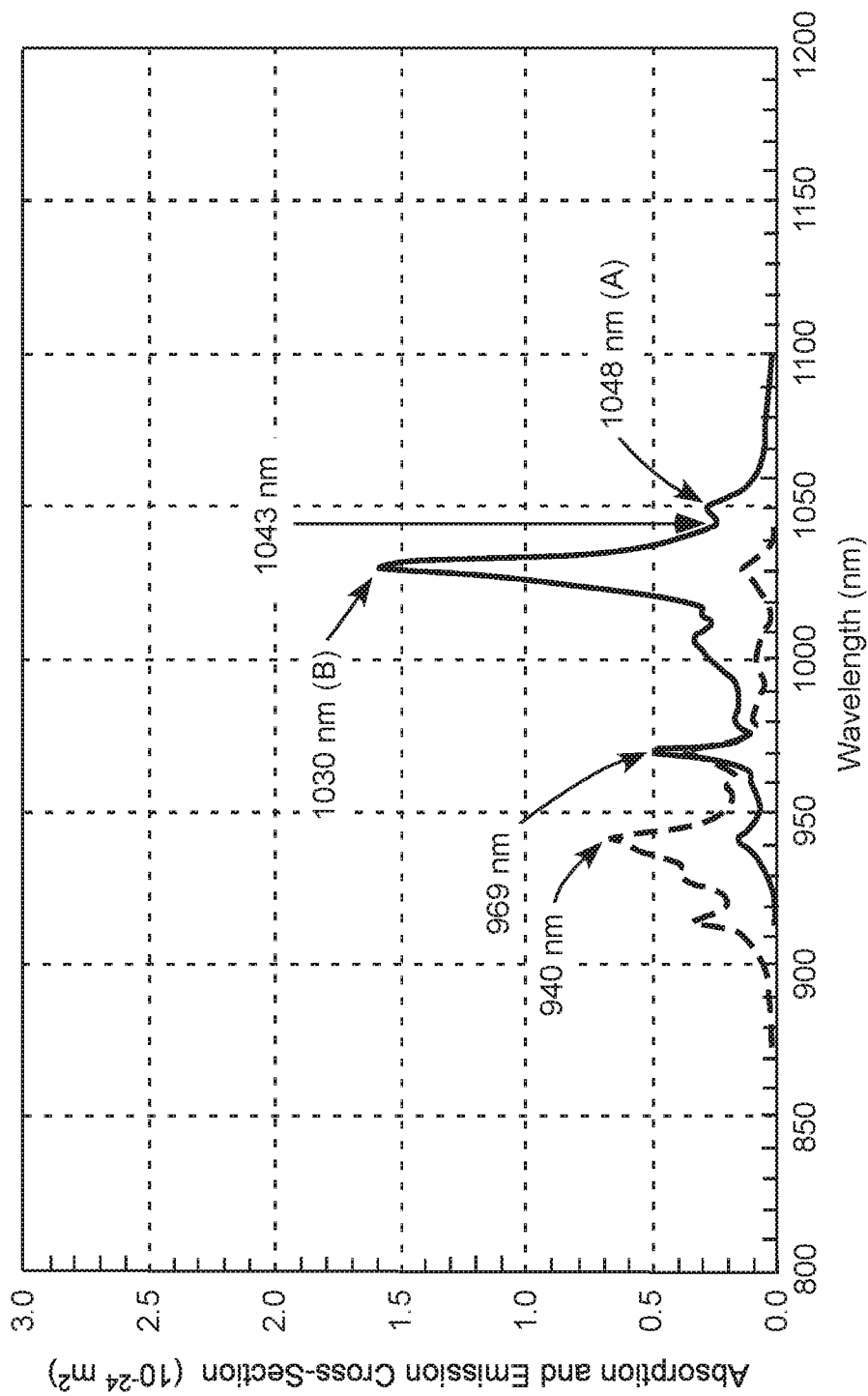
FIG. 4 is a graph schematically illustrating absorption and emission cross-sections as a function of wavelength, at a temperature of 80° C., for one preferred gain-medium (Yb:YAG) for the solid-state amplifier of FIG. 1, indicating most-preferred central wavelengths 1043 nm and 1048 nm for the stretched pulses to be amplified therein.

FIG. 4 is a graph schematically illustrating absorption (dashed curve) and emission (solid curve) cross-sections as a function of wavelength for one preferred gain-medium (Yb:YAG) for solid-state amplifier 26 of FIG. 1. Here, it is desired to use a gain-bandwidth of about 17 nm around an emission side-peak A at a wavelength of 1048 nm to amplify the seed optical pulses from fiber-MOPA 12. This gain-bandwidth permits compression of the amplified pulses to a pulse duration of less than 400 fs, preferably less than 200 fs. The seed optical pulses have a center wavelength in a range between about 1038 nm and about 1052 nm, preferably between about 1043 nm and about 1048 nm. An absolute maximum emission peak B at 1030 nm is outside the preferred range of wavelengths for the seed optical pulses.

A most-preferred center wavelength for the seed optical pulses is about 1043 nm. This wavelength corresponds to a local minimum in the emission cross-section, which is beneficial because higher gain on either side of the center wavelength helps overcome gain narrowing, thereby maintaining a broadest possible bandwidth through amplification. In order to minimize parasitic amplification at the absolute maximum emission peak B at a wavelength of 1030 nm, it preferable that the 1043 nm seed optical pulses are delivered to the amplifier at an average power of greater than about 10 W, most-preferably greater than about 20 W. Discrimination between the 1030 nm gain peak and the weaker 1048 nm gain peak is assisted by the fact that absorption is significantly stronger at 1030 nm than at 1048 nm (as can be seen in the graph), allowing un-pumped areas of the gain-slab to attenuate any parasitic laser-radiation at about 1030 nm. Additional optical elements, such as spectral filters or gratings, can be inserted to provide more loss at 1030 nm. Pump wavelengths can be at or relatively close to a peak absorption wavelength, at about 940 nm or about 969 nm, as discussed above.

Another most-preferred center wavelength for the seed optical pulses is about 1048 nm. Seeding at a wavelength that corresponds to a local peak in the emission cross-section tends to mitigate gain pulling, which shifts the center wavelength during amplification. Selection of a specific center wavelength between 1043 nm and 1048 nm can be made in view of the considerations set forth herein and the desired properties of the output beam of pulses.

The Yb:YAG absorption and emission cross-sections of FIG. 4 are temperature dependent. When Yb:YAG becomes hotter, emission cross-sections at the absolute maximum emission peak at about 1030 nm and the emission side peak at about 1048 nm are suppressed, while the local minimum in emission at about 1043 nm is enhanced. These spectral changes are apparent above about 80° C. as a flatter emission spectrum around 1043 nm. Overall, the flatter emission spectrum helps mitigate gain narrowing in the inventive amplifier, when seeding with pulses having a center wavelength of about 1043 nm and with heating provided by the optical pumping.

Figure 5:
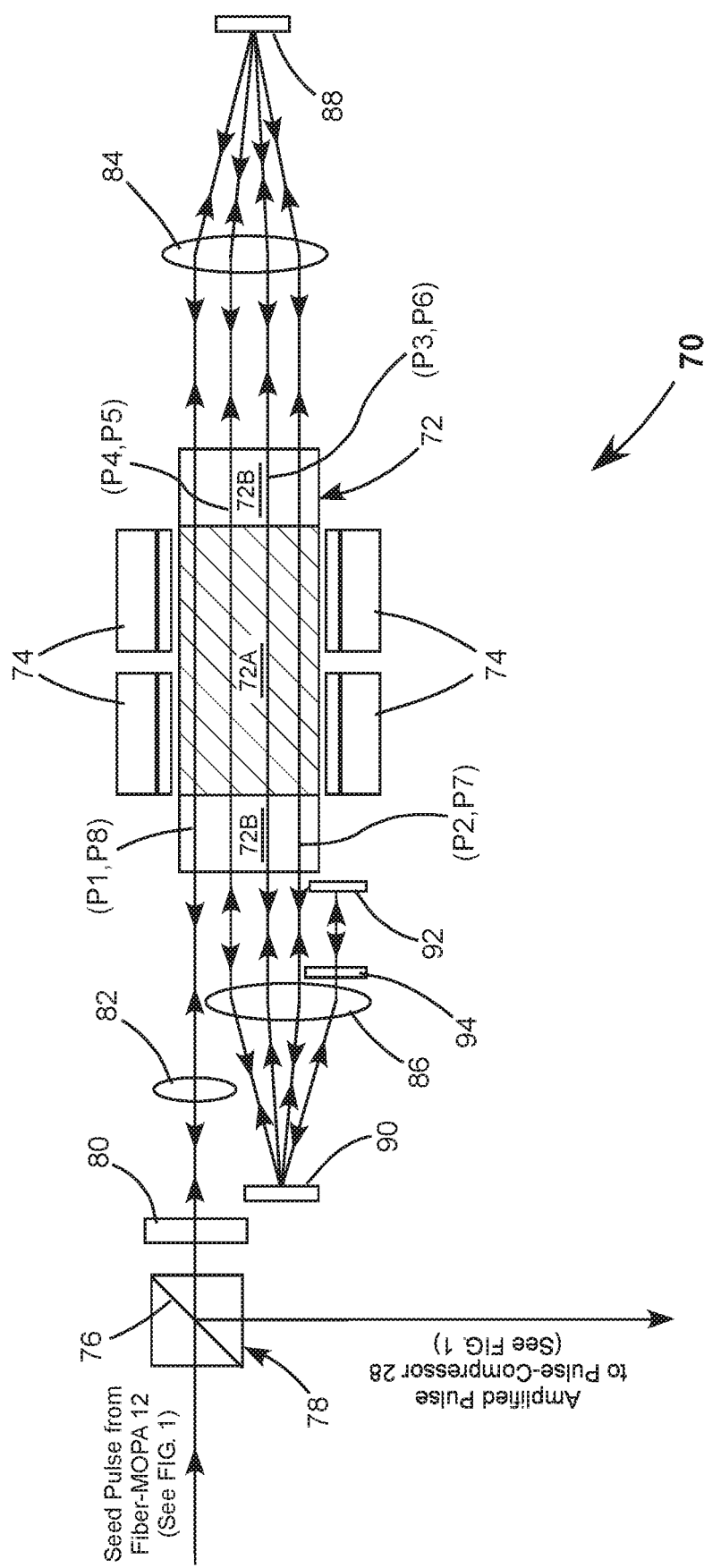
FIG. 5 schematically illustrates another preferred multi-pass configuration of the solid-state amplifier of FIG. 1.

FIG. 5 schematically illustrates another preferred multi-pass configuration 70 of solid-state amplifier 26 of FIG. 1. Solid-state amplifier 70 includes an elongated rectangular gain-slab 72 pumped by a plurality of diode-laser packages 74 arranged along long edges of the gain-slab. By way of example, the gain-slab has dimensions 30 mm×10 mm×1 mm. The diode-laser bar packages are arranged such that an area 72A of gain-slab 72 is pumped, with areas 72B (here, two) remaining un-pumped for discrimination against parasitic amplification at an absolute maximum emission peak, as discussed above. Solid-state amplifier 70, here, is arranged such that pulses being amplified make a total of eight passes through gain-slab 72. Here again, cooling can be applied to slab faces, the cooling direction of the slab being perpendicular to the gain direction. In this arrangement the gain direction, the pump direction, and the cooling direction are mutually perpendicular.

Linearly polarized seed optical pulses from fiber-MOPA 12 of FIG. 1 are directed into solid-state amplifier 70 through polarization-selective surface 76 of a bi-prism polarizer 78. The seed optical pulses are transmitted through a quarter-wave plate 80 and then collimated by a lens 82. The eight passes through the amplifier are caused by an optical relay formed by positive lenses 84 and 86 cooperative with mirrors 88, 90, and 92. Forward and reverse passes occur along four common paths in the gain-slab. The passes corresponding to each of the common paths are numbered in the drawing as passes P1 through P8. The beam size of the pulse is about the same on each pass.

After a final (here, eighth) pass, amplified pulses are directed back towards polarizer 78 The polarization orientation of the amplified pulses is rotated 90° with respect to the polarization of the seed optical pulses in the two passes through quarter-wave plate 80. The polarization-rotated amplified pulses are reflected out of the amplifier by polarization-selective surface 76 of polarizer 78.

An optional filter element 94 may be included between lens 86 and mirror 92 to further suppress parasitic amplification, by providing loss at the absolute maximum emission peak, as discussed above. For example, a long-wavelength band-pass filter, an etalon, or a standard grating-compressor having a beam-block. The beam-block is arranged to block wavelengths around the absolute maximum emission peak in a spectrally dispersed beam within the grating-compressor. Band-pass filters, etalons, and grating-compressors are well known the optics art and description thereof is not necessary for understanding the principles of the present invention. Similarly, if necessary, a filter element may be included in solid-state amplifier 40 of FIG. 2, preferably located in at least one of the partially amplified beams between dichroic mirror 46 and cylindrical mirror 50 or dichroic mirror 48 and cylindrical mirror 54.

As described above, Yb:YAG is a preferred gain-medium for the solid-state multi-pass amplifier. The inventive MOPA is capable of delivering laser-radiation pulses having a center-wavelength between 1038 nm and 1052 nm, a duration of less than 200 fs, and an average power greater than 100 W. This is achieved by generating seed optical pulses having an average power of greater than 10 W in a fiber- MOPA, amplifying those pulses in a solid-state multi-pass amplifier, and compressing the amplified pulses to a desired pulse-duration.

Other ytterbium-doped crystalline gain-media provide usable gain from about 1038 nm to about 1100 nm, with similar gain characteristics, and may be substituted without departing from the sprit and scope of the present invention. By way of example, ytterbium-doped lutetium aluminum garnet (Yb:LuAG), ytterbium-doped lutetium scandium oxide (Yb:LuScO), ytterbium-doped lutetium oxide (Yb:Lu$_2$O$_3$), and ytterbium-doped scandium oxide (Yb:Sc$_2$O$_3$) all have emission characteristics similar to Yb:YAG. These gain-media have a maximum emission peak at longer wavelengths in the range 1031 nm to 1042 nm, a local minimum in the emission cross-section, and a smaller emission peak at a wavelength between 1038 nm and 1100 nm. For solid-state multi-pass amplifiers using gain-elements made of these alternative crystalline gain-media, the seed optical pulses to be amplified preferably have a center-wavelength in a range between about 1040 nm and about 1100 nm.

Glass gain-media have lower thermal conductivity than crystalline gain-media and are not as amenable to pulse energy and average power scaling. Power scaling requires higher-power optical pumping and produces more waste heat. Aberrations in the thermal lens created by this waste heat eventually cause losses that overwhelm any additional gain produced by increasing the optical pumping. The inventive solid-state amplifier, therefore, has a crystalline gain-medium.

A gain-element in the form of a slab is preferred for reasons discussed above regarding cooling the gain-element in a direction perpendicular to the gain direction of the gain-element. Alternatively, the gain-element may be in the form of a rod or a bar, without departing from the spirit and scope of the present invention.

While a fiber-MOPA is preferred for supplying seed optical pulses to be amplified, seed optical pulses may be supplied by a solid-state oscillator having a non-fiber gain-element. By way of example, one solid-state laser capable of supplying such seed optical pulses has a gain-element made of ytterbium-doped calcium aluminum gadolinium oxide (Yb:CALGO).

In summary, the present invention is described above with reference to preferred embodiments. The invention is not limited, however, to the embodiments described and depicted therein. Rather, the invention is limited only by the claims appended hereto.

What is claimed is:

1. Laser apparatus, comprising:
   a fiber-laser oscillator delivering optical pulses having a first pulse-duration, the pulses having a center-wavelength between 1038 nanometers and 1052 nanometers;
   a pulse-stretcher arranged to stretch the duration of the optical pulses to a second pulse-duration longer than the first pulse-duration;
   at least one fiber-amplifier arranged to amplify the stretched optical pulses;
   a solid-state multi-pass amplifier including a gain-element made of ytterbium-doped yttrium aluminum garnet having a peak-gain wavelength of about 1030 nm, arranged to further amplify the amplified stretched optical pulses from the fiber-amplifier; and
   a pulse-compressor arranged to reduce the duration of the further-amplified optical pulses from the solid-state multi-pass amplifier to a duration of less than about 400 femtoseconds.

2. The apparatus of claim 1, wherein the center wavelength of the optical pulses from the fiber-laser oscillator is about 1043 nanometers.

3. The apparatus of claim 1, wherein the center wavelength of the optical pulses from the fiber-laser oscillator is about 1048 nanometers.

4. The apparatus of claim 1, wherein the gain-element of the solid-state multi-pass amplifier is in the form of a slab.

5. The apparatus of claim 4, wherein the amplified stretched optical pulses being further amplified make less than about 12 passes through the slab gain-element.

6. The apparatus of claim 4, wherein the slab gain-element has at least one un-pumped area that attenuates parasitic lasing at about 1030 nanometers.

7. The apparatus of claim 1, wherein the amplified stretched optical pulses from the fiber-amplifier have a pulse energy to suppress parasitic lasing at about 1030 nanometers.

8. The apparatus of claim 1, wherein the amplified stretched optical pulses from the fiber-amplifier have an average power of greater than about 20 Watts and the reduced-duration pulses from the pulse-compressor have an average power of greater than about 100 Watts.

9. The apparatus of claim 1, further including a filter element located in the solid-state multi-pass amplifier that provides loss at about 1030 nanometers.

10. The apparatus of claim 9, wherein the filtering element is a grating-compressor and a beam-block, the beam-block blocking 1030 nanometers in a spectrally dispersed beam within the grating-compressor.

11. The apparatus of claim 1, wherein the reduced-duration pulses from the pulse-compressor have a duration of less than about 200 femtoseconds.

* * * * *